3,082,564
MINNOW TRAPS
Arlie Lee Groce, 7260 Chalmers Ave., Warren, Mich.
Filed Feb. 8, 1962, Ser. No. 171,975
2 Claims. (Cl. 43—102)

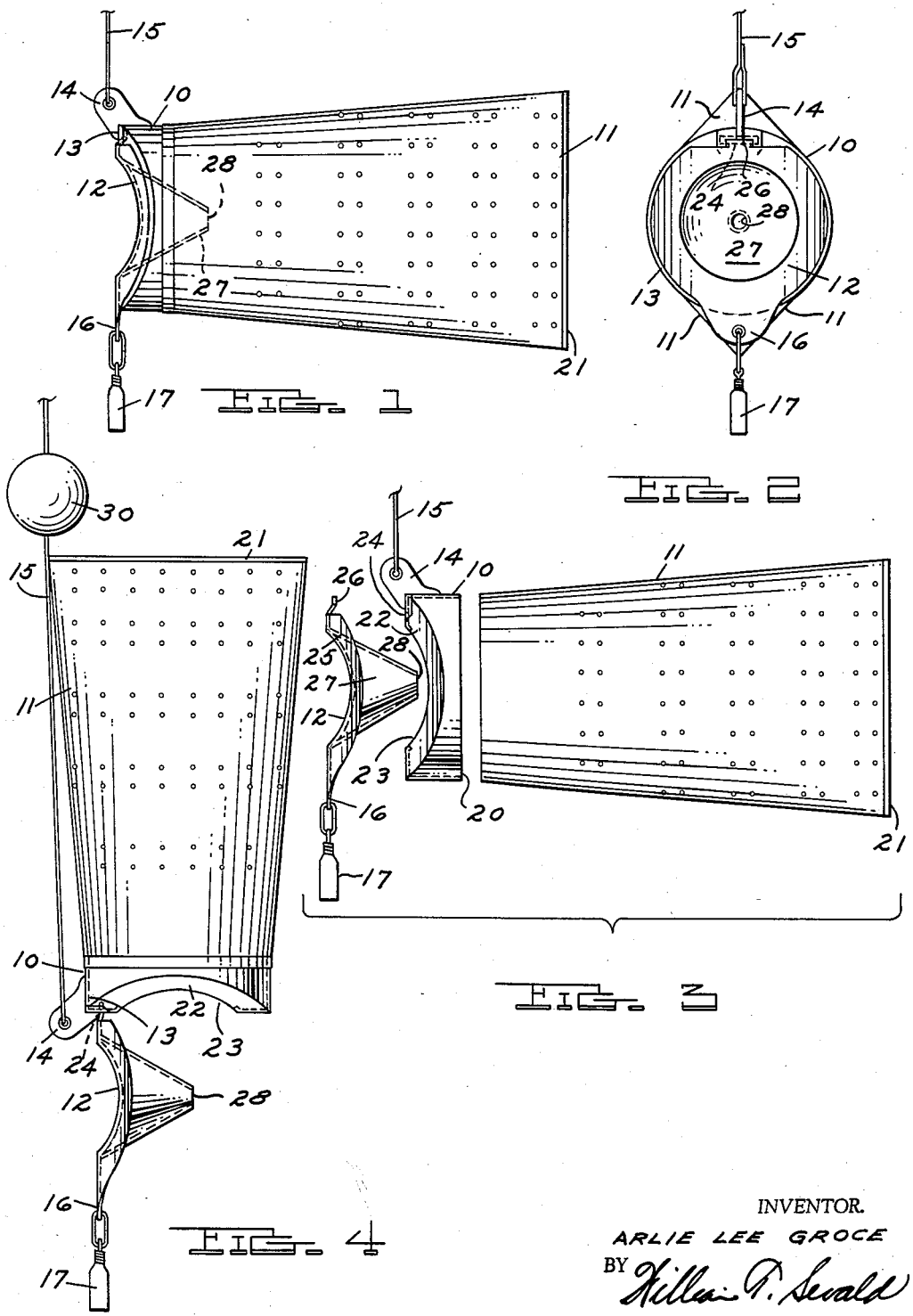

This invention relates to minnow traps and in particular relates to an easily collapsed, stored, carried, extended and used minnow trap which automatically evacuates entrapped air upon being immersed in water.

Minnow traps have been employed heretofore to facilitate obtaining fish bait, however, the several devices of the prior art have not proven entirely satisfactory inasmuch as they are complicated in design and construction, expensive to manufacture, difficult to use, and are not readily collapsed, stored, carried, extended, and used.

With the foregoing in view, the primary object of the invention is to provide a minnow trap which is simple in design and construction, inexpensive to manufacture, easy to use, and which is easily collapsed, stored, carried, extended, and used.

An object of the invention is to provide a relatively rigid sleeve constituting an open throat for an attached synthetic resin perforated bag which is easily rolled up and stored.

An object of the invention is to provide a head hingedly connected to the sleeve throat having a truncated hollow cone with an open interior small end as the trap baffle element.

An object of the invention is to provide a hinge connection between the top of the sleeve and the top of the head so that the sleeve throat and head can swing relative to one another.

An object of the invention is to provide line suspension means on the throat adjacent the hinge connection to the head.

An object of the invention is to provide weight attaching means diametrically opposite the hinge connection on the head.

An object of the invention is to provide a hinge connection on the sleeve throat so it can swing the bag to a vertical air evacuation position when the device is immersed in water.

An object of the invention is to provide a hinge connection between the head and the sleeve throat so that the sleeve throat can swing to a closed position relative to the head.

An object of the invention is to provide a weight on the bottom portion of the head so that it remains in a substantially vertical position at all times.

These and other objects of the inventions will become apparent by reference to the following description of a minnow trap embodying the invention taken in connection with the accompanying drawing in which:

FIG. 1 is a side elevational view of the device such as when immersed in water.

FIG. 2 is a face elevational view of the device seen in FIG. 1.

FIG. 3 is an exploded view of the device seen in FIG. 1 showing the various elements; and FIG. 4 is a side elevational view of the device in the condition automatically assumed just after being immersed in water showing the throat and perforate bag in the air evacuating vertical position.

Referring now to the drawing wherein like numerals refer to like and corresponding parts throughout the several views, the minnow trap disclosed therein to illustrate the invention comprises, a sleeve throat 10 having a perforate collapsible bag 11 connected thereto, a head 12 hingedly connected to the sleeve 10 at 13, line connecting means 14 on the throat 10 for attaching a line 15 thereto, and weight connecting means 16 on the head 12 for attaching a weight 17 thereto.

More particularly, the sleeve throat 10 has an open end 20 communicating with the interior of the bag 11 and upon which end 20 the bag 11 is attached. The bag 11 has a sealed outer end 21 preventing escape of entrapped minnows. A neck flange 22 is formed on the other end of the sleeve throat 10 and has a central aperture 23 permitting communication therethrough and the neck flange 22 has a hinge portion 24 adjacent the line attaching means 14 at the top thereof.

The head 12 has a head flange 25 normally overlying the neck flange 22, a hinge portion 26 hingedly connecting with the hinge portion 24, and a truncated hollow conical baffle 27 having an open end 28 leading from the head flange 25.

The bag 11 may be a perforate polyethylene bag and the throat sleeve 10 is preferably clear synthetic resin as is the head 12, however, the head flange 25 is colored with a minnow attracting differentiating color such as red or gold. The bag 11 is easily cemented or bonded to the throat 20 and the hinge means 24—26 easily connect the throat 10 and head 12.

In operation, the user attaches a line 15 to the connecting means 14 and preferably also attaches a float 30 to the line so as to exert an upward pull on the line attaching means 14 and throat 10 against the downward drag of the sinker weight 17 which is coordinated with the buoyancy of the float 30 so as to rest on the bottom of the body of water in the position seen in FIG. 1.

When the user throws the described minnow trap into the water the sinker exerts a downward pull on the head 12 pulling it into a vertical position whereas entrapped air in the throat 10 and perforate bag 11 causes the bag 11 and throat 10 to move to a vertical position as seen in FIG. 4 until the air bleeds out through the perforations in the bag. The bag and throat and head are thus completely evacuated of air whereupon the bag 11 and throat 10 drop from the position seen in FIG. 4 to the position seen in FIG. 1 so that the head 12 closes the aperture 23 in the throat flange 22 and the device is now in operative position.

The inventive minnow trap with the features and structure described constitutes a simple, inexpensive, easily collapsible and stored device which operates automatically when thrown into water to evacuate entrapped air and to assume a minnow trapping condition. It is to be noted that when the device is retracted from the water via the line 15 that the direction of pull on the line further urges the device into the closed position so to maintain the trap closed on the minnows contained in the throat 10 and bag 11.

Although but a single element and embodiment of the invention has been shown and described in detail, it is obvious that many changes may be made in the size, shape, detail, and arrangement of the various elements of the inventions within the scope of the appended claims.

I claim:

1. An easily collapsed, carried, extended, and used minnow trap requiring very little of storage space so that it will fit in a tackle box, provide good trap characteristics, and suitable to be made of non-rusting inexpensive synthetic resin materials such as polyethylene comprising, a relatively rigid throat sleeve having opposite ends, a neck flange having a central aperture on one end of said sleeve, line connecting means on said sleeve adjacent said neck flange, a perforate collapsible bag having an open end fixed on the other end of said sleeve and a closed end spaced from said sleeve, a head having a head flange disposed over said neck flange, hinge means interconnecting said neck flange and said head flange adjacent said line connecting means, sinker weight connecting means on said head flange diametrically opposite to said hinge means, and a hollow truncated conical trap element having its one larger end connected to said head flange and its other smaller end having an aperture normally extending inwardly of said sleeve through said neck flange aperture; a line attached to said line connecting means; said minnow trap being suspendable in water on said line attached to said line connecting means with said head closing said neck flange opening, a weight attached to said sinker weight connecting means; said head and hinge means when said sleeve is suspended on a line and weighted by said weight holding said sleeve and perforate bag substantially horizontal with the weight of said sleeve and bag swinging said sleeve down on said head in closed relationship therewith via said hinge means; said sleeve and perforate bag on said sleeve swinging to a vertical position via said hinge means when first said trap is first immersed in water to quickly evacuate all entrapped air in said bag and said sleeve whereupon said sleeve and perforate bag on said sleeve assume the said horizontal position.

2. An easily collapsed, carried, extended, and used minnow trap requiring very little storage space so that it will fit in a tackle box, comprising, a relatively rigid throat sleeve having an opening therethrough and opposite ends, line connecting means on said sleeve adjacent one of said opposite ends, a line on said line connecting means, a perforate foldable bag having an open end fixed on the other of said opposite ends of said sleeve and a closed end spaced from said sleeve, a head having a head flange disposed over said sleeve adjacent said line connecting means, hinge means interconnecting said sleeve and said head adjacent said line connecting means, sinker weight connecting means on said head flange diametrically opposite to said hinge means, a sinker on said sinker weight connecting means, and a hollow truncated conical trap element having its one larger end connected to said head flange and its other smaller end having an aperture extending inwardly of said sleeve; said minnow trap being suspendable in water on said line attached to said line connecting means with said head closing said sleeve opening via said weight attached to said head sinker weight connecting means; said head and hinge means when said sleeve is suspended on said line and said head weighted by said sinker holding said sleeve and said perforate bag on said sleeve substantially horizontal with the weight of said sleeve and bag swinging said sleeve down on said head in closed relationship therewith via said hinge means; said sleeve and perforate bag on said sleeve swinging to a vertical position via said hinge means when first immersed in water to quickly evacuate all entrapped air whereupon said sleeve and perforate bag assume the said horizontal position.

References Cited in the file of this patent
UNITED STATES PATENTS

| | | |
|---|---|---|
| 2,361,321 | Schleier | Oct. 24, 1944 |
| 2,465,812 | Mohme | Mar. 29, 1949 |
| 2,809,463 | Buss | Oct. 15, 1957 |